United States Patent
Wall et al.

(10) Patent No.: US 11,383,194 B2
(45) Date of Patent: Jul. 12, 2022

(54) REUSABLE AIR FILTER SYSTEM AND METHOD

(71) Applicant: K&N Engineering, Inc., Riverside, CA (US)

(72) Inventors: Jere James Wall, Helendale, CA (US); Steve Williams, Beaumont, CA (US)

(73) Assignee: K&N Engineering, Inc., Riverside, CA (US)

(*) Notice: Subject to any disclaimer, the term of this patent is extended or adjusted under 35 U.S.C. 154(b) by 131 days.

(21) Appl. No.: 16/582,533

(22) Filed: Sep. 25, 2019

(65) Prior Publication Data
US 2020/0016525 A1    Jan. 16, 2020

Related U.S. Application Data

(63) Continuation of application No. 15/469,198, filed on Mar. 24, 2017, now Pat. No. 10,456,727.

(Continued)

(51) Int. Cl.
*B01D 46/00*       (2022.01)
*F02M 35/02*       (2006.01)
(Continued)

(52) U.S. Cl.
CPC ............ *B01D 46/521* (2013.01); *B01D 46/10* (2013.01); *B01D 46/2411* (2013.01);
(Continued)

(58) Field of Classification Search
CPC .......................... B01D 46/10; B01D 46/2411; B01D 46/2414; B01D 46/521; B01D 2279/60;
(Continued)

(56) References Cited

U.S. PATENT DOCUMENTS 4,349,363 A * 9/1982 Patel ...................... B01D 29/23
                                                                  55/498
4,473,471 A * 9/1984 Robichaud ............. B01D 27/10
                                                                  210/443

(Continued)

OTHER PUBLICATIONS

International Search Report, PCT Application No. PCT/US2017/024113, dated Jun. 15, 2017.

*Primary Examiner* — Frank M Lawrence, Jr.
(74) *Attorney, Agent, or Firm* — Rutan & Tucker LLP; Hani Z. Sayed

(57) ABSTRACT

A reusable air filter and methods are provided for filtering air being conducted to an air intake of an internal combustion engine. The reusable air filter comprises a filter medium configured to pass an airstream and entrap particulates flowing within the airstream. The filter medium is comprised of cotton gauze disposed in a sinusoidal arrangement that provides a filtration surface area that is larger than a perimeter area of the filter medium. An end cap and base may be configured to retain the filter medium therebetween. The base provides an interface between the air filter and an air inlet of the engine. The filter medium may be disposed in a flat, panel shape that is bordered by a supportive tray. Support rods may be embedded within the tray to prevent bowing of the tray due to air pressure when coupled with an air box of the engine.

18 Claims, 6 Drawing Sheets

Related U.S. Application Data

(60) Provisional application No. 62/312,930, filed on Mar. 24, 2016.

(51) Int. Cl.
    *B01D 46/52*     (2006.01)
    *B01D 46/24*     (2006.01)
    *F02M 35/024*     (2006.01)
    *B01D 46/10*     (2006.01)

(52) U.S. Cl.
    CPC ... *B01D 46/2414* (2013.01); *F02M 35/02425* (2013.01); *F02M 35/02483* (2013.01); *F02M 35/02491* (2013.01); *B01D 2275/201* (2013.01); *B01D 2275/206* (2013.01); *B01D 2279/60* (2013.01)

(58) Field of Classification Search
    CPC ........ B01D 2275/102; B01D 2275/206; F02M 35/02425; F02M 35/02483; F02M 35/02491
    USPC ...... 55/385.3, 490, 495, 497, 498, 494, 502, 55/505, 511; 123/198 E
    See application file for complete search history.

(56) References Cited

U.S. PATENT DOCUMENTS

| | | | |
|---|---|---|---|
| 5,098,767 A | 3/1992 | Linnersten | |
| 5,238,717 A * | 8/1993 | Boylan | B29C 65/08 428/35.7 |
| 5,484,466 A * | 1/1996 | Brown | B01D 46/0004 55/498 |
| 5,509,950 A | 4/1996 | van de Graaf et al. | |
| 5,674,302 A * | 10/1997 | Nakayama | B01D 46/0001 210/493.1 |
| 6,045,598 A | 4/2000 | Fath et al. | |
| 6,136,076 A * | 10/2000 | Read | B01D 46/0005 55/480 |
| 6,447,567 B1 * | 9/2002 | Ehrenberg | B01D 46/2414 55/498 |
| 7,041,158 B1 * | 5/2006 | Chilton | B01D 46/2414 55/482 |
| 7,735,659 B2 | 6/2010 | Haes | |
| 2002/0020156 A1 | 2/2002 | Goerg | |
| 2003/0029144 A1 | 2/2003 | Bergami | |
| 2005/0022490 A1 | 2/2005 | Huang et al. | |
| 2005/0076621 A1 | 4/2005 | Chang | |
| 2005/0076625 A1 | 4/2005 | Mahan | |
| 2007/0006560 A1 | 1/2007 | Ruhland et al. | |
| 2010/0139629 A1 | 6/2010 | Engelland et al. | |
| 2010/0229513 A1 | 9/2010 | Eisengraeber-Pabst et al. | |
| 2011/0000174 A1 * | 1/2011 | Kapelarie | F02M 35/024 55/492 |
| 2012/0291408 A1 | 11/2012 | Ehrenberg et al. | |
| 2015/0075123 A1 | 3/2015 | Carter et al. | |
| 2015/0233327 A1 | 8/2015 | McClelland et al. | |
| 2015/0267653 A1 | 9/2015 | Kinsey, Jr. | |

\* cited by examiner

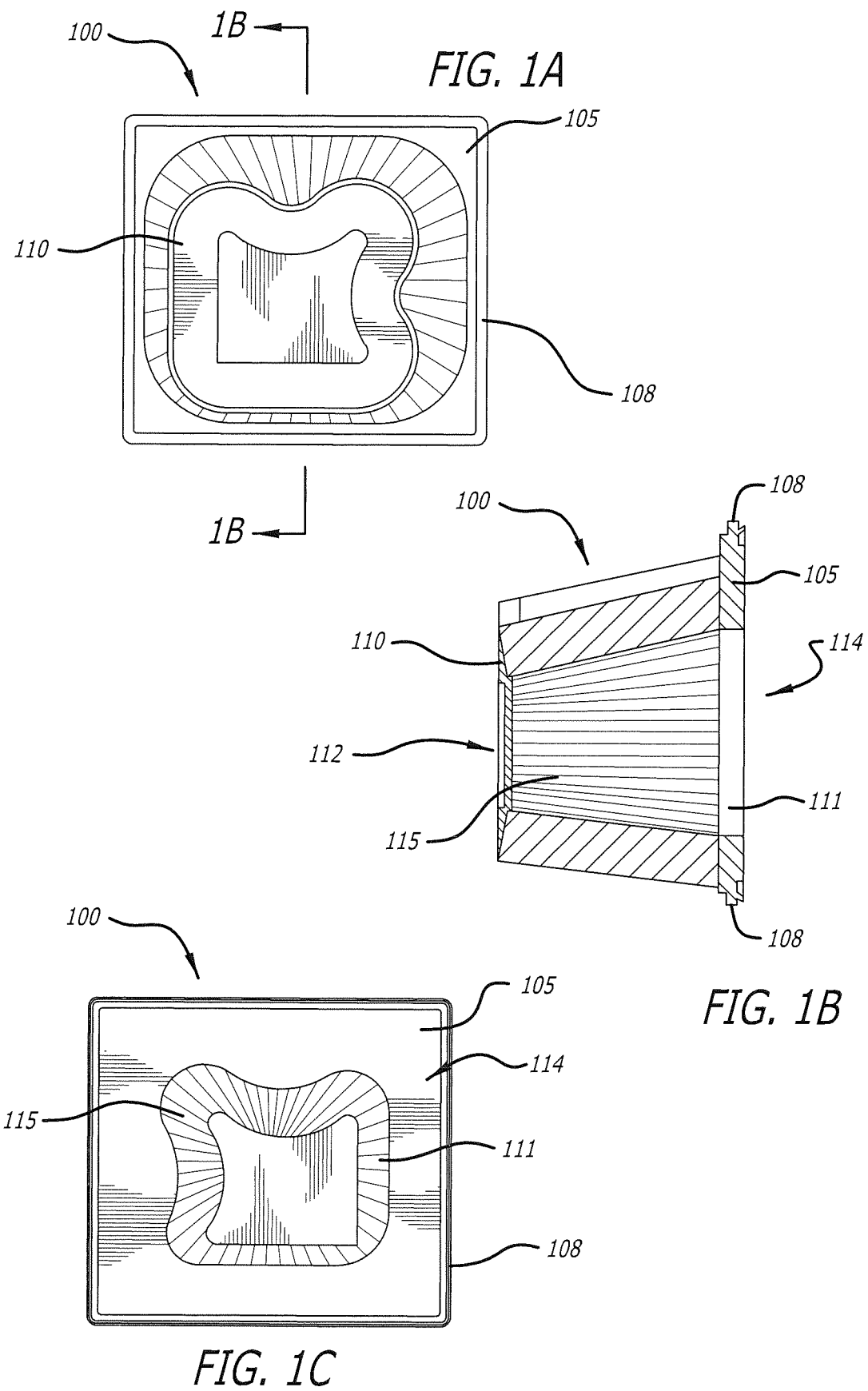

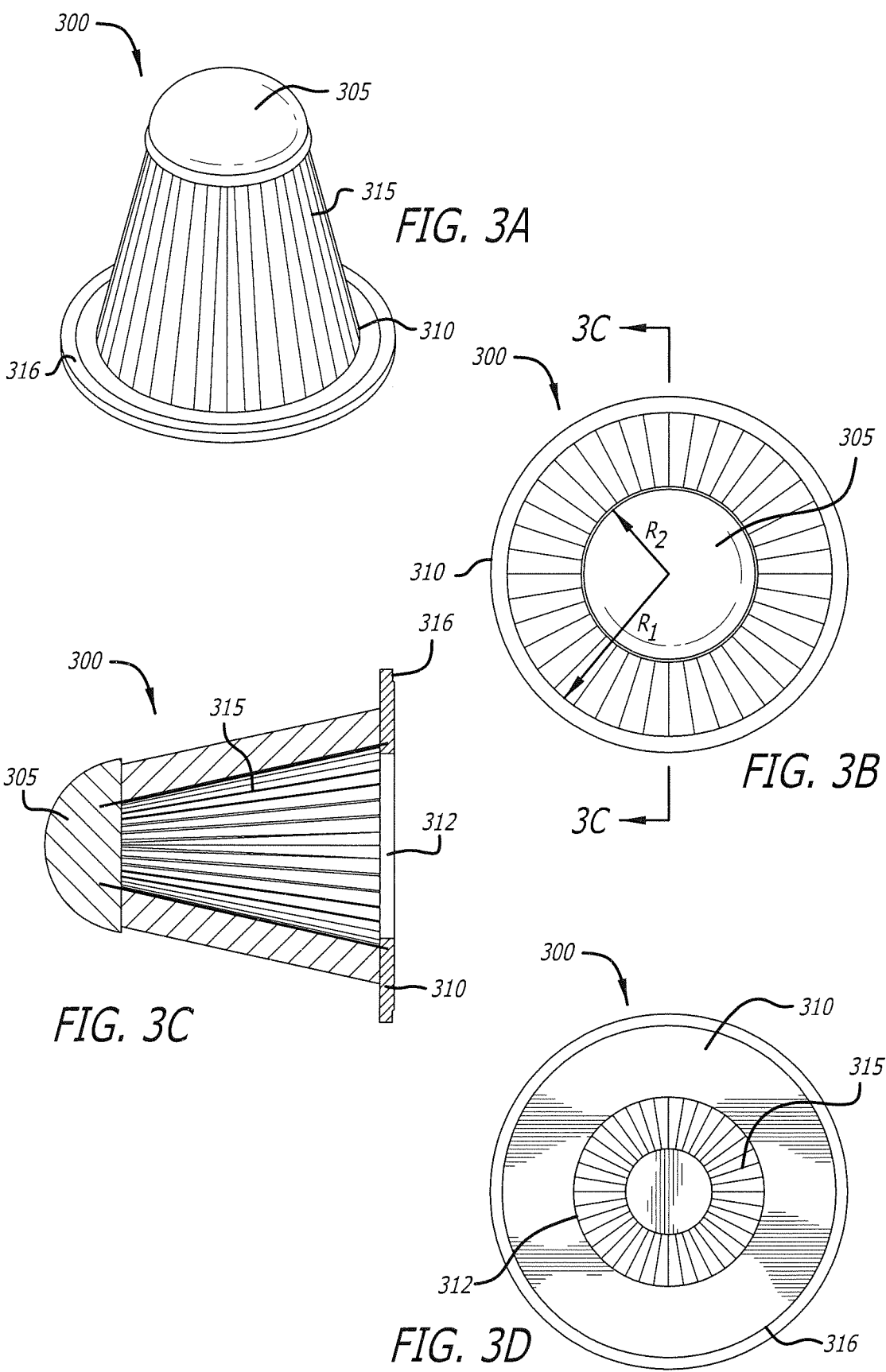

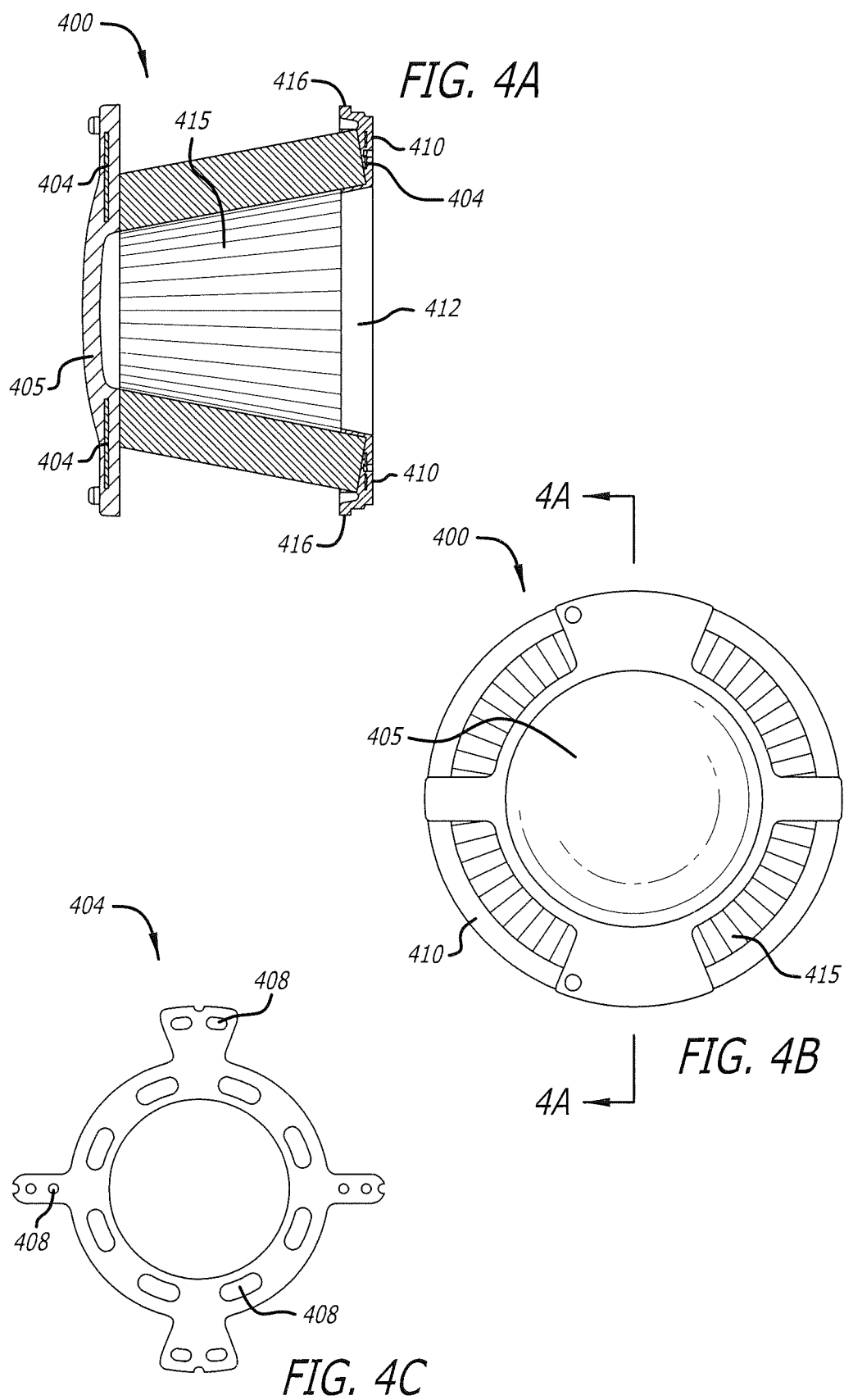

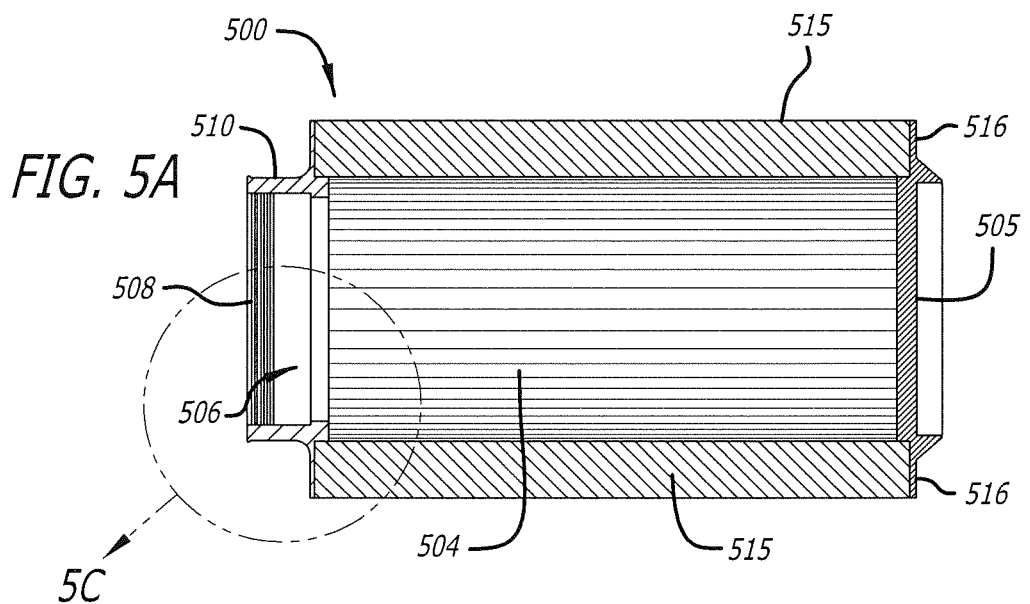
FIG. 5A
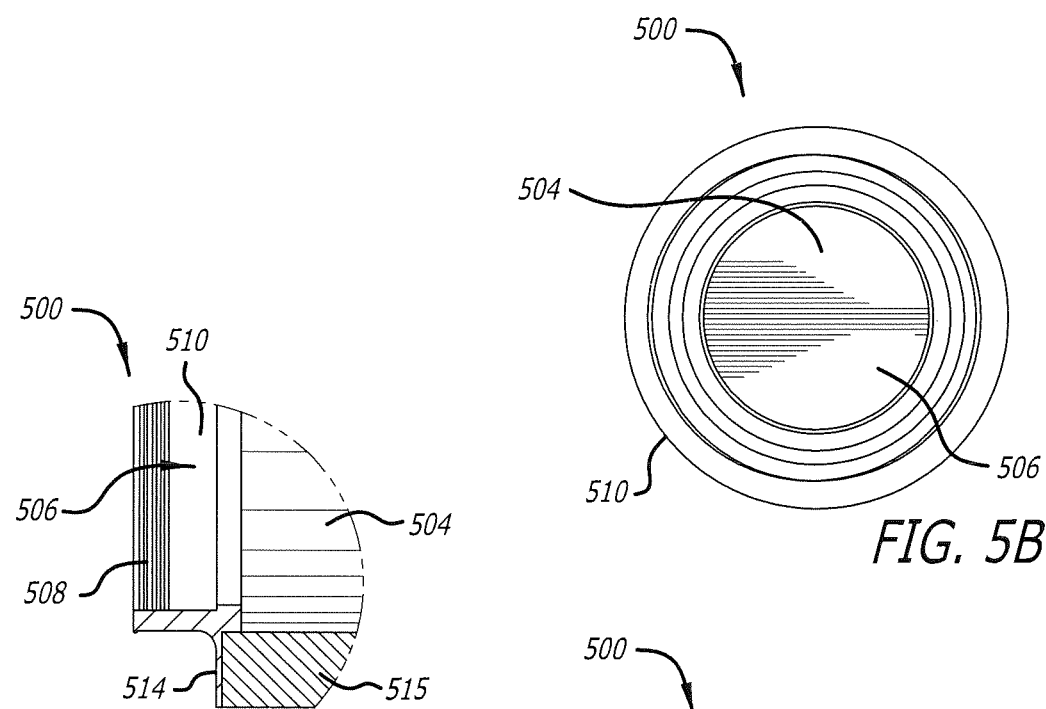
FIG. 5C
FIG. 5B
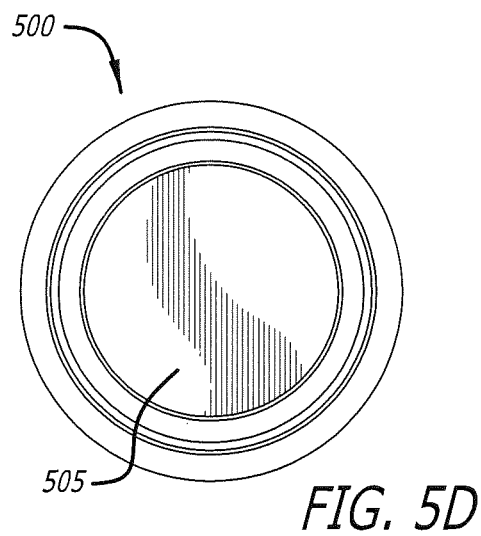
FIG. 5D

REUSABLE AIR FILTER SYSTEM AND METHOD

PRIORITY

This application is a Continuation of U.S. patent application Ser. No. 15/469,198, filed Mar. 24, 2017, which claims the benefit of and priority to U.S. Provisional Application No. 62/312,930, filed Mar. 24, 2016, both of which are incorporated herein in their entirety.

FIELD

The field of the present disclosure generally relates to air filters. More particularly, the field of the invention relates to an apparatus and a method for a reusable air filter system configured to filter air to an air intake of an internal combustion engine.

BACKGROUND

An air filter designed to remove particulate is generally a device composed of fibrous materials. These fibrous materials may remove solid particulates such as dust, pollen, mold, and bacteria from the air. Air filters are used in applications where air quality is important, notably in building ventilation systems and in engines.

Air filters may be used in automobiles, trucks, tractors, locomotives and other vehicles that use internal combustion engines. Air filters may be used with gasoline engines, diesel engines, or other engines that run on fossil fuels or other combustible substances. Air filters may be used with engines in which combustion is intermittent, such as four-stroke and two-stroke piston engines, as well as other types of engines that take in air so that a combustible substance may be burned. For example, air filters may be used with some gas turbines. Filters may also be used with air compressors or in other devices that take in air.

Filters may be made from pleated paper, foam, cotton, spun fiberglass, or other known filter materials. Generally, the air intakes of internal combustion engines and compressors tend to use either: paper, foam, or cotton filters. Some filters use an oil bath. An air filter for an internal combustion engine prevents abrasive particulate matter from entering the engine's cylinders, where it would cause mechanical wear and oil contamination. Many fuel injected engines utilize a flat panel, pleated paper filter element. This filter is usually placed inside an enclosed, plastic box connected to a throttle body by way of ductwork. Vehicles that use carburetors or throttle body fuel injection systems typically use an air filter positioned above the carburetor or the throttle body.

A drawback to conventional air filters is that even if improved airflow is provided, conventional air filters sacrifice filtering ability and engine protection in the process. Conventional air filters are typically made of paper, and thus they may provide filtration, but at an expense of desirable airflow which could be used to improve performance characteristics of a motor vehicle. Moreover, as air filters become dirty, the effective airflow that is received by the engine of the motor vehicle decreases, which is to be expected over time and use. Further still, when conventional air filters become dirty, they must be replaced, and thus represent at least one additional maintenance cost for the owner of the motor vehicle, for example.

What is needed, therefore, is a reusable air filter system that increases airflow to an engine without decreasing filtration capability, such that the increased airflow remains consistent throughout the filter's service interval, and also such that the filter may be periodically cleaned and reused.

SUMMARY

A reusable air filter and methods are provided for filtering air being conducted to an air intake of an internal combustion engine. The reusable air filter comprises a filter medium configured to pass an airstream and entrap particulates flowing within the airstream. The filter medium is comprised of one or more layers of cotton gauze that are disposed into a sinusoidal arrangement comprising a series of peaks and troughs that provide a filtration surface area that is larger than a perimeter area of the filter medium. In some embodiments, an end cap and a base are configured to retain the filter medium therebetween. The base is configured to support the air filter and provide an interface between the air filter and an air inlet of the internal combustion engine. In some embodiments, the filter medium is disposed in a flat, panel shape that is bordered by a supportive tray. Support rods may be embedded within the material comprising the tray and configured to prevent the sides of the tray from bowing under air pressure when coupled with an air box of the internal combustion engine.

In an exemplary embodiment, a reusable air filter for filtering air being conducted to an air intake of an internal combustion engine comprises a filter medium configured to pass an airstream and entrap particulates flowing within the airstream; and an end cap and a base configured to retain the filter medium therebetween. In another exemplary embodiment, the filter medium is comprised of one or more layers of cotton gauze that are disposed into a sinusoidal arrangement comprising a series of peaks and troughs to provide a filtration surface area that is larger than a perimeter area of the filter medium. In another exemplary embodiment, the filter medium comprises a cube shape having waved sides to optimally occupy an interior volume of an air box. In another exemplary embodiment, the filter medium comprises any one of a cylindrical shape and a cone shape, and wherein the end cap is configured to enclose an interior of the reusable air filter and direct the airstream to the filter medium.

In another exemplary embodiment, the base is configured to support the air filter and provide an interface between the air filter and an air inlet of the internal combustion engine. In another exemplary embodiment, the interface is comprised of an inlet receiver configured to be coupled with any of an intake pipe, a turbocharger, and a manifold of the internal combustion engine. In another exemplary embodiment, the base comprises any of a variety of ridges and raised portions so as to optimally engage with the air inlet.

In an exemplary embodiment, a reusable air filter for filtering air being conducted to an air intake of an internal combustion engine comprises a filter medium configured to pass an airstream and entrap particulates flowing within the airstream; and a tray configured to supportively retain the filter medium. In another exemplary embodiment, the filter medium is comprised of one or more layers of cotton gauze that are disposed into a sinusoidal arrangement comprising a series of peaks and troughs so as to provide a filtration surface area that is larger than a perimeter area of the filter medium. In another exemplary embodiment, the filter medium comprises a series of peaks and troughs, and wherein the troughs are wider than the peaks such that the peaks offer relatively little resistance to the airstream and the troughs provide a relatively large filtration surface area to capture particulate matter.

In another exemplary embodiment, the tray is configured to support the air filter within an air box that is coupled with an air inlet of the internal combustion engine, the air inlet being any of an intake pipe, a turbocharger, and a manifold of the internal combustion engine. In another exemplary embodiment, the tray comprises rounded edges disposed at corner portions of any one of a square shape, a rectangle shape, and a trapezoid shape. In another exemplary embodiment, the tray comprises a lip configured to establish an airtight seal with a mounting surface disposed within an air box that is coupled with an air inlet of the internal combustion engine. In another exemplary embodiment, the reusable air filter further comprises support rods that are embedded within the material comprising the tray and configured to prevent the sides of the tray from bowing under air pressure when coupled with an air box of the internal combustion engine.

In an exemplary embodiment, a method for a reusable air filter for filtering air being conducted to an air intake of an internal combustion engine comprises configuring a cleanable filter medium to entrap particulates flowing within an airstream; forming the cleanable filter medium into a shape that facilitates coupling the reusable air filter with an air box, such that an entirety of the airstream is passed through the filter medium; contouring the cleanable filter medium to provide a filtration surface area that is larger than an area of the shape; and coupling the filter medium with one or more support structures that maintain the shape of the filter medium.

In another exemplary embodiment, forming further comprises forming the cleanable filter medium into any one of a cylindrical shape, a cone shape, and a cube shape having waved sides. In another exemplary embodiment, coupling further comprises implementing the support structures as an end cap and a base that is configured to couple with an air inlet of the internal combustion engine, the air inlet being any of an intake pipe, a turbocharger, and a manifold of the internal combustion engine. In another exemplary embodiment, forming further comprises faulting the cleanable filter medium into any one of a square shape, a rectangle shape, and a trapezoid shape. In another exemplary embodiment, coupling further comprises implementing the support structures as a tray configured to support the air filter within an air box that is coupled with an air inlet of the internal combustion engine, the air inlet being any of an intake pipe, a turbocharger, and a manifold of the internal combustion engine. In another exemplary embodiment, coupling further comprises embedding support rods within the material comprising the tray to prevent the sides of the tray from bowing under air pressure when coupled with an air box of the internal combustion engine.

BRIEF DESCRIPTION OF THE DRAWINGS

The drawings refer to embodiments of the present disclosure in which:

FIG. 1A illustrates a top plan view of an exemplary embodiment of a reusable air filter comprising an end cap, a base, and a filter medium;

FIG. 1B illustrates a cross-sectional view of the reusable air filter of FIG. 1A, taken along a line 1B-1B;

FIG. 1C illustrates a bottom plan view of the reusable air filter of FIG. 1A;

FIG. 3A illustrates a perspective view of an exemplary embodiment of a reusable air filter comprising an end cap, a base, and a filter medium;

FIG. 3B illustrates a top plan view of the reusable air filter shown in FIG. 3A;

FIG. 3C illustrates a cross-sectional view of the reusable air filter of FIG. 3A, taken along a line 3C-3C of FIG. 3B;

FIG. 3D illustrates a bottom plan view of the reusable air filter of FIG. 3A;

FIG. 4A illustrates a cross-sectional view of an exemplary embodiment of a reusable air filter comprising a reinforced end cap, a base, and a filter medium;

FIG. 4B illustrates a top plan view of the reusable air filter of FIG. 4A;

FIG. 4C illustrates a top plan view of an exemplary embodiment of a reinforcement ring that may be incorporated into the end cap of the reusable air filter shown in FIG. 4A;

FIG. 5A illustrates a cross-sectional view of an exemplary embodiment of a cylindrically-shaped reusable air filter;

FIG. 5B illustrates a bottom plan view of the reusable air filter of FIG. 5A;

FIG. 5C illustrates a close-up view of the reusable air filter of FIG. 5A;

FIG. 5D illustrates a top plan view of the reusable air filter of FIG. 5A;

Figure 2A:
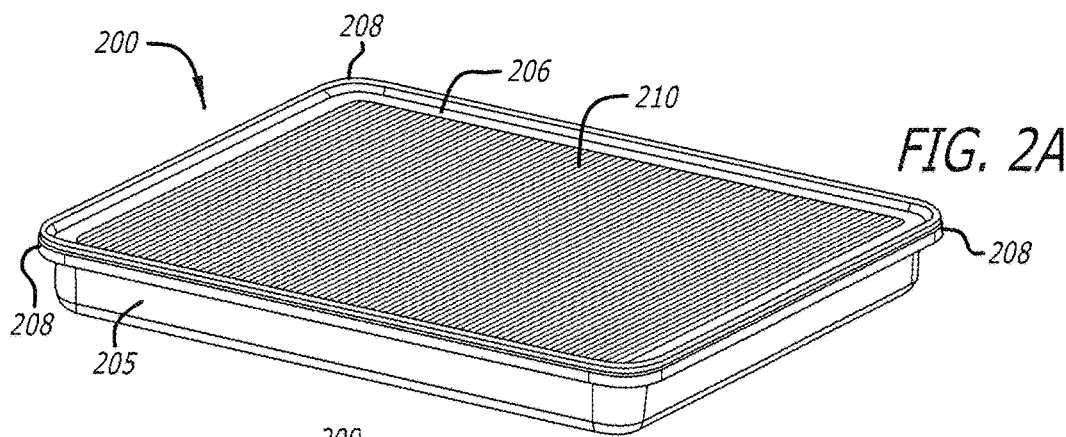
FIG. 2A illustrates a perspective view of an exemplary embodiment of a reusable air filter comprising a tray and a filter medium.
Figure 2B:
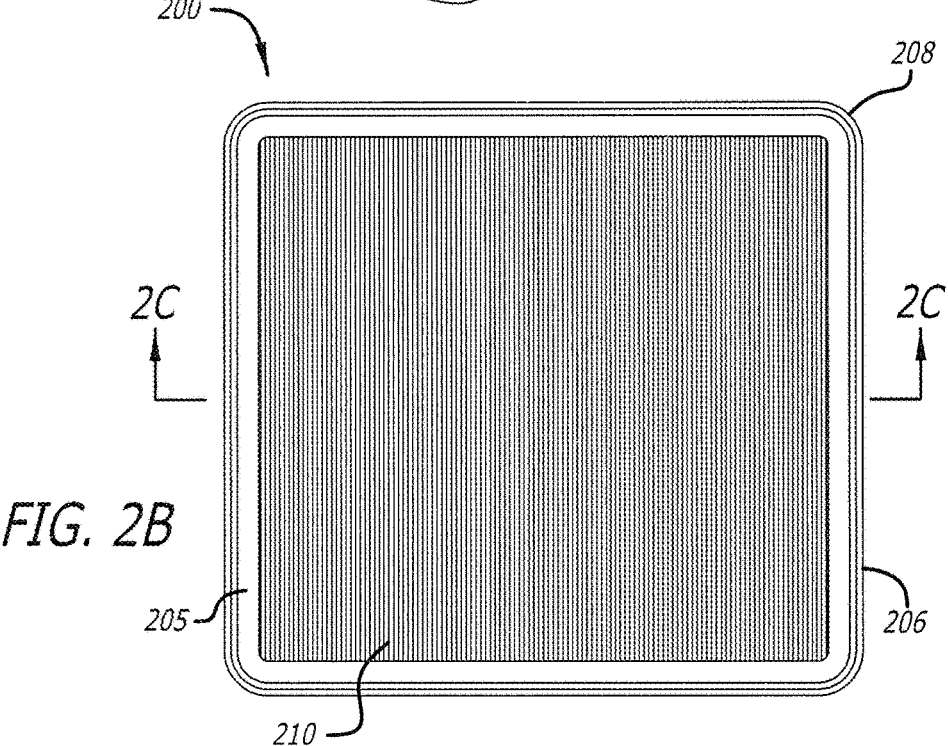
FIG. 2B illustrates a top plan view of the reusable air filter of FIG. 2A.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first filter medium," may be made. However, the specific numeric reference should not be interpreted as a literal sequential order but rather interpreted that the "first filter medium" is different than a "second filter medium." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a reusable air filter that is configured to filter air being conducted to an air intake of an internal combustion engine. The air filter includes a filter medium configured to pass an airstream and entrap particulates flowing within the airstream. The filter medium is desirably shaped and formed so as to provide an optimal filtration surface area within the confines of the air filter. The air filter may be configured to be mounted within an air box, or fastened to an interior of an engine bay. It should be understood that embodiments of the present disclosure are not limited to the exact shapes illustrated, but rather may include a wide variety of generally cylindrical shapes, generally circular, oval, round, curved, conical, or other closed perimeter shape, that provide a relatively large filtration surface area in a given volume of the filter. Moreover, embodiments as described herein are not limited to use as internal combustion engine filters, but rather may have applicability in other filtration systems in which a large volume of air needs to be treated.

FIGS. 1A-1C illustrate an exemplary embodiment of a reusable air filter 100, according to the present disclosure. More specifically, FIG. 1A illustrates a top plan view of the reusable air filter 100. As shown, the reusable air filter 100 comprises an end cap 110, a base 105 that includes an air inlet receiver 111 configured to receive an air inlet of the engine, and a filter medium 115 coupled between the base and the end cap. The filter medium 115 generally is configured to remove particulate matter and other contaminates from an incoming air stream. In some embodiments, the filter medium may comprise paper, foam, cotton, spun fiberglass, or other known filter materials, woven or non-woven material, synthetic or natural, or any combination thereof. In some embodiments, the filter medium may include a filter oil composition to enhance air cleaning properties of the filter medium. It is envisioned that the reusable air filter 100 may be mounted within an air box (not shown). Preferably, the air box is comprised of a rigid material that is sufficiently durable and temperature resistant to retain its configuration during installation and operation when coupled with the air intake of the engine.

As best shown in FIG. 1B, the filter medium 115 provides an area to pass an airstream and entrap particulates and other contaminates flowing with the airstream. The filter medium 115 may be pleated, or otherwise shaped, or contoured so as to increase a filtration surface area for passing the airstream to be cleaned. In the illustrated embodiment of FIGS. 1A-1C, the filter medium 115 comprises a generally cube shape, featuring waved sides so as to occupy as much volume as possible within the air box. Moreover, the filter medium 115 features rounded and/or contoured edges so as to further increase the surface area for filtration purposes, and also desirably increase power output of the engine. As such, in one embodiment, it is contemplated that the cube-shaped filter medium 115 may be beneficial for vehicle applications requiring special hauling capacity and/or towing power, such as, by way of non-limiting example, heavy-duty pickups. In one embodiment, the filter medium 115 comprises a first end 112 and a second end 114, such that the first end 112 has a small diameter as compared to the diameter of the second end 114. Consequently, the filter medium 115 comprises a diameter that tapers along the length of the filter medium, extending from the second end 114 to the first end 112. In one embodiment, the filter medium 115 tapers at a substantially 31-degree angle with respect to the base 105.

In some embodiments, the filter medium 115 may be comprised of 4 to 6 layers of cotton gauze sandwiched between a first outer, metallic screen and a second, inner metallic screen. It is contemplated that, in some embodiments, the first and second metallic screens may be co-pleated with the cotton gauze. In one embodiment, the filter medium 115 may have a pleat-count of substantially 75 pleats, although the pleat-count may be varied depending on the application. Further, the cotton may be advantageously treated with a suitably formulated filter oil composition that causes tackiness throughout microscopic strands comprising the filter medium. The nature of the cotton allows high volumes of airflow, and when combined with the tackiness of the filter oil composition creates a powerful filtering medium that exhibits little resistance to the airstream passing through the air filter 100. Further details about components comprising the filter medium 115, as well as details regarding the filter oil composition, are disclosed in U.S. patent application Ser. No. 14/181,678, entitled "Air Box With Integrated Filter Media," filed on Feb. 16, 2014, and U.S. patent application Ser. No. 14/701,163, entitled "Filter Oil Formulation," filed on Apr. 30, 2015, the entirety of each of which is incorporated herein by reference.

FIG. 1C illustrates a bottom plan view of the reusable air filter 100, showing the inlet receiver 111 disposed in the base 105. The base 105 generally is configured to support the air filter 100 and provide an interface between the air filter 100 and an air box coupled with an air inlet, such as, for example, an intake pipe, a turbocharger, a manifold, and the like, without limitation. As such, it is contemplated that the base 105 may comprise any of a variety of additional ridges, or raised portions, so as to optimally engage the air box. The specific configuration of the base 105 and the size of the inlet receiver 111 depend upon the particular make and model of the vehicle for which the air filter 100 is to be utilized, and thus a wide variety of configurations and sizes may be incorporated into the air filter 100 without straying beyond the scope of the present disclosure.

In the embodiment illustrated in FIG. 1C, the base 105 further comprises a lip element 108 that is configured to mate and/or otherwise couple with the air box. In some embodiments, the base 105 may comprise any of various holes so as to receive any fasteners known in the art. Further, any of a variety of suitable tabs, screws, and various insertion points may be disposed on the base 105, without limitation, for the purpose of supporting the air filter 100 within the air box. Thus, as will be appreciated by those skilled in the art, the configuration of the base 105 depends upon the particular vehicle for which the reusable air filter 100 is to be used.

It is envisioned that a user of the reusable air filter 100 may periodically clean the filter medium 115 rather than replacing the reusable air filter 100, as is typically done with conventional air filter systems. In some embodiments, a method for cleaning the filter medium 115 comprises removing the reusable air filter 100 from the engine bay, inserting a water hose through the inlet receiver 111 into an interior cavity of the filter, and spraying water so as to flush contaminants from the filter medium 115. In some embodiments, the method for cleaning the reusable air filter 100 may comprise utilizing a high-pressure air hose in lieu of the water hose. In some embodiments, the method for cleaning the reusable air filter 100 may comprise spraying water onto the exterior of the filter medium 115, such that the water and contaminants drain from the exterior of the filter medium 115. Other cleaning methods will be apparent to those skilled in the art without deviating from the spirit and scope of the present disclosure.

FIG. 2A illustrates a perspective view of an exemplary embodiment of a reusable air filter 200 comprising a tray 205 that borders a filter medium 210. The tray 205 comprises a lip 206 that may be used to couple the reusable air filer 200 with an optional air box, for example, or otherwise support the air filter within an engine bay. The lip 206 may comprise any of suitably designed holes, brackets, molded shaped portions, protrusions, extensions, angled brackets, hardware fasteners, or other any similar device for supporting the reusable air filter 200 within the air box or the engine bay, without limitation. As will be recognized, the particular fasteners generally will vary according to the specific make and model of the vehicle with which the reusable air filter 200 is to be used.

Figure 2C:
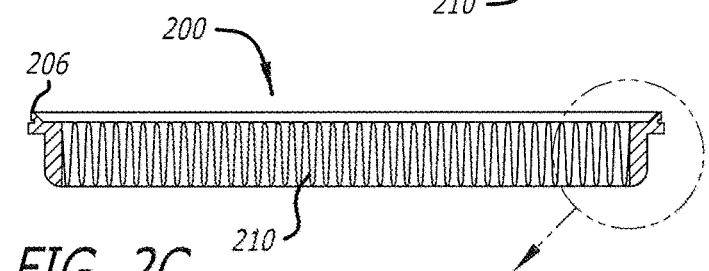
FIG. 2C illustrates a cross-sectional view of the reusable air filter of FIG. 2B, taken along a line 2C-2C.
Figure 2D:
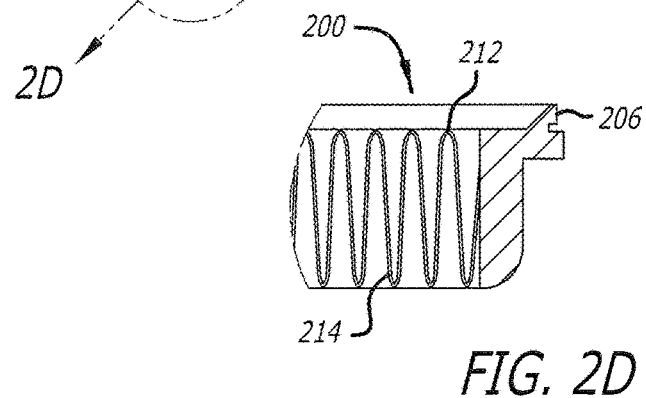
FIG. 2D illustrates a close-up view of the reusable air filter shown in FIG. 2C.

The filter medium 210 generally is coupled with the tray 205 and configured to remove particulate matter and other contaminates from an incoming airstream. The filter medium 210 is substantially similar to the filter medium 115, illustrated in FIGS. 1A-1C, with the exception that the filter medium 210 is disposed in a flat, or panel configuration. The filter medium 210 may be comprised of paper, foam, cotton, spun fiberglass, or other known filter materials, woven or non-woven material, synthetic or natural, or any combination thereof. In some embodiments, the filter medium 210 may be comprised of 4 to 6 layers of cotton gauze that may be treated with a filter oil composition to enhance air cleaning properties of the filter medium 210. As described herein, the nature of the cotton allows high volumes of airflow through the filter medium 210, and when combined with the tackiness of the filter oil composition creates a powerful filtering medium that exhibit relatively little resistance to the air flow through the filter medium. Further, the filter medium 210 may be comprised of pleated layers of cotton gauze arranged into a generally sinusoidal configuration. In the illustrated embodiment of FIGS. 2C-2D, the sinusoidal configuration of the filter medium 210 comprises a series of peaks 212 and troughs 214, wherein the troughs 214 are relatively wider than the peaks 212. It is contemplated that the peaks 212 offer relatively little resistance to the airstream, and the troughs 214 provide a relatively large filtration surface area to capture particulate matter.

Moreover, in some embodiments, the tray 205 may be comprised of rounded edges 208 configured to couple with the interior surfaces of an air box. It should be understood that although the reusable air filter 200 is shown as having a substantially square shape with rounded edges 208, a number of other shapes may be used in lieu of the square shape, including, by way of non-limiting example, trapezoidal, trapezium, rectangle, and the like, alone or in combination with the rounded edges 208. As such, in one embodiment, the reusable air filter 200 has a width of substantially 11.82", and a length of approximately 12.49", although a wide variety of other widths and lengths are contemplated.

It is envisioned that a user of the reusable air filter 200 may periodically clean the filter medium 210 rather than replacing the reusable air filter 200, as is typically done with conventional air filter systems. Methods for cleaning the reusable air filter 200 are substantially similar to the methods for cleaning the reusable air filter 100, discussed in connection with FIGS. 1A-1C. In some embodiments, wherein the filter medium 210 comprises a filter oil composition, a solvent may be used to remove the oil from the filter medium. Once the filter medium 210 is free of oil and substantially dry, a suitably formulated filter oil composition may be uniformly applied and allowed to wick into the filter medium. Further details about suitable filter oil compositions are disclosed in above-disclosed U.S. patent application Ser. No. 14/701,163, entitled "Filter Oil Formulation," which is incorporated by reference hereinabove. Various other cleaning methods will be apparent to those skilled in the art without deviating from the spirit and scope of the present disclosure.

FIGS. 3A-3D illustrate an exemplary embodiment of a reusable air filter 300 that is similar to the reusable air filter 100, discussed with respect to FIGS. 1A-1C. As best shown in FIG. 3A, the reusable air filter 300 comprises an end cap 305, a base 310, and filter medium 315 coupled therebetween. The end cap 310 preferably comprises a hemispherical shape configured to direct an airstream into the filter medium 315. In one embodiment, the end cap 305 has a diameter of substantially 4.03", and a height of substantially 1.76". Further, in one embodiment, the reusable air filter 300 has a height of substantially 8.01", and a diameter of substantially 8.16". It should be appreciated, however, that the specific diameter and height of the end cap 305, as well as the diameter and height of the entirety of the reusable air filter 300, will depend upon the particular application for which the air filter is intended to be used.

FIG. 3B illustrates a top plan view of the reusable air filter 300. As shown, the base 310 has a radius, $R_1$, that is greater than a radius, $R_2$, of the end cap 305. In one embodiment, a logo may be etched and/or otherwise disposed on the end cap 305. As shown in FIG. 3C, the filter medium 315 preferably comprises pleated layers of cotton gauze so as to increase the filtration surface area within the confines of the air filter 300, while also desirably increasing power output of the engine by way of reduced intake air resistance. The cotton may be advantageously treated with a suitably formulated filter oil composition that causes tackiness throughout microscopic strands comprising the filter medium 315. As described herein, the nature of the cotton allows high volumes of airflow, and when combined with the tackiness of the filter oil composition creates a powerful filtering medium which ensures a high degree of air filtration.

The base 310 generally is configured to support the air filter 300 and provide an interface between the air filter and an air inlet of the engine. It is contemplated that the air inlet may be an intake pipe, a turbocharger, a manifold, and the like, without limitation. As best shown in FIG. 3D, the base 310 comprises an inlet receiver 312 that facilitates coupling the air filter 300 with the air inlet of the engine. Further, the base 310 may comprise a lip 316 that facilitates coupling the air filter 300 within an air box, or elsewhere in the engine bay. The lip 316 may be comprised of any of suitably designed holes, brackets, molded shaped portions, protrusions, extensions, angled brackets, hardware fasteners, or any other similar device for holding the reusable air filter 300 fixed within the engine bay, and/or within the air box. Moreover, it is contemplated that the base 310 may comprise any of a variety of additional ridges, or raised portions, so as to optimally engage the air inlet of the engine. The specific configuration of the base 310 and the diameter of the inlet receiver 312 depend upon the particular make and model of the vehicle for which the air filter 300 is to be utilized, and thus a wide variety of configurations and diameters may be incorporated into the air filter 300 without straying beyond the scope of the present disclosure.

As described hereinabove with respect to FIGS. 1A-2D, a user of the reusable air filter 300 may periodically clean the filter medium 315 rather than replacing the reusable air filter 300. Methods for cleaning the reusable air filter 300 are substantially similar to the methods for cleaning the reusable air filter 200, discussed in connection with FIGS. 2A-2D. It is contemplated that various other cleaning methods will be apparent to those skilled in the art without deviating beyond the present disclosure.

FIGS. 4A-4C illustrate an exemplary embodiment of a reusable air filter 400 that is comprised of a reinforced end cap 405, a base 410, and a filter medium 415. FIG. 4A illustrates a cross-sectional view of the reusable air filter 400. The reusable air filter 400 generally is round and the filter medium 415 has a diameter near the base 410 that is larger than the diameter near the reinforced end cap 405, giving the filter medium a cone-shape. As best shown in FIG. 4B, however, the reinforced end cap 405 comprises portions that have a diameter substantially similar to the diameter of the base 410. In one embodiment, a logo may be etched and/or otherwise disposed on the reinforced end cap 405. In some embodiments, the reinforced end cap 405 and the base 410 may be comprised of polyurethane, or any other similarly rigid material without limitation. Preferably, a reinforcement ring 404, illustrated in FIG. 4C, is disposed within the material comprising the reinforced end cap 405 so as to provide structural integrity to the reusable air filter 400. In one embodiment, a plurality of holes 408 are disposed in the reinforcement ring 404 to facilitate bonding the material comprising the reinforced end cap 405 with the reinforcement ring. As will be appreciated, the specific number and layout of the plurality of holes 408 are not limited to those illustrated and discussed herein, but rather the number and layout of the holes 408 may be varied without limitation.

The filter medium 415 preferably comprises pleated layers of cotton gauze that may be advantageously treated with a suitably formulated filter oil composition that causes tackiness throughout microscopic strands comprising the filter medium. As described herein, the nature of the cotton allows high volumes of airflow, and when combined with the tackiness of the filter oil composition creates a powerful filtering medium which ensures a high degree of air filtration. Further, the filter medium 415 may be periodically cleaned in a substantially similar manner as explained herein with respect to the reusable air filters 100, 200. Methods for cleaning the reusable air filter 400 are substantially similar to the methods for cleaning the reusable air filter 200, discussed in connection with FIGS. 2A-2D. It is contemplated that various other cleaning methods will be apparent to those skilled in the art without deviating beyond the present disclosure.

As shown in the embodiment of FIG. 4A, a subtle, hemispherical shape may be incorporated into the reinforced end cap 405. In some embodiments, the subtle, hemispherical shape may contribute to the structural integrity of the reinforced end cap 405 in particular, and to the air filter 400 in general. The base 410 generally is configured to support the air filter 400 and provide an interface between the air filter and an air inlet of an engine. For example, the base 410 may be coupled with an intake pipe, a turbocharger, a manifold, and the like, without limitation. As best shown in FIG. 4A, the base 410 comprises an inlet receiver 412 that facilitates directing an airstream from the filter medium 415 into the air inlet of the engine. Further, the base 410 may comprise a lip 416 that is configured to couple the air filter 400 with an air box, or elsewhere in the engine bay. The lip 416 may be comprised of any of suitably designed holes, brackets, molded shaped portions, protrusions, extensions, angled brackets, hardware fasteners, or other any similar device for supporting the reusable air filter 400 within the engine bay, and/or within the air box. In some embodiments, the base 410 may comprise any of a variety of additional ridges, or raised portions, so as to optimally engage with the air inlet of the engine. The specific configuration of the base 410 and the diameter of the opening 412 depend upon the particular make and model of the vehicle for which the air filter 400 is to be utilized, and thus a wide variety of configurations and diameters may be incorporated into the air filter 400 without straying beyond the scope of the present disclosure.

FIGS. 5A-5D illustrate an exemplary embodiment of a generally cylindrically-shaped reusable air filter 500 that is comprised of an end cap 505, a base 510, and a filter medium 515. The filter medium 515 preferably comprises pleated layers of cotton gauze configured to increase filtration surface area. The filter medium 515 may be configured to be treated with a suitable filter oil composition so as to enhance the filtration properties of the air filter while also giving rise to a relatively greater power output of the engine, as described herein. In one embodiment, a logo may be etched and/or otherwise disposed on the end cap 505. In the illustrated embodiment of FIGS. 5A-5D, the base 510 has substantially the same radius as compared to the end cap 505, giving the reusable air filter 500 the abovementioned cylindrical shape. It should be understood, however, that the reusable air filter 500 is not limited to the exact shape illustrated, but rather may include a wide variety of generally cylindrical shapes, generally circular, oval, round, curved, conical, or other closed perimeter shape, that provide a relatively large filtration surface area in a given volume of the filter.

As best shown in FIG. 5A, an inlet receiver 506 provides an opening into an interior 504 of the air filter 500. The inlet receiver 506 is configured to be coupled with an air inlet of the engine, such as, for example, an intake pipe, a turbocharger, a manifold, and the like. A series of grooves 508 are disposed around the interior perimeter of the inlet receiver 506 and configured to facilitate an airtight coupling of the base 510 with the air intake of the engine. As such, it is contemplated that the base 510 may be comprised of any of a variety of additional ridges, or raised portions, so as to optimally engage with the air inlet. The specific configuration of the base 510 and the diameter of the inlet receiver 506 depend upon the particular make and model of the vehicle for which the air filter 500 is to be utilized, and thus a wide variety of configurations and diameters may be incorporated into the air filter 500 without straying beyond the scope of the present disclosure.

The filter medium 515 preferably is fixedly coupled between the base 510 and the end cap 505. As best shown in FIG. 5C, the base 510 is coupled with the filter medium 515 by way of a flange 514. A similar flange 516 couples the end cap 505 with the filter medium 515. It is contemplated, however, that any of various suitable structures, fasteners, or adhesives may be used to retain the filter medium 515 between the base 510 and the end cap 505. As such, in some embodiments, any of suitably designed holes, brackets, molded shaped portions, protrusions, extensions, angled brackets, hardware fasteners, or other any similar device may be incorporated into the reusable air filter 500 for coupling the filter medium 515 between the end cap 505 and the base 510, without limitation.

Figure 6A:
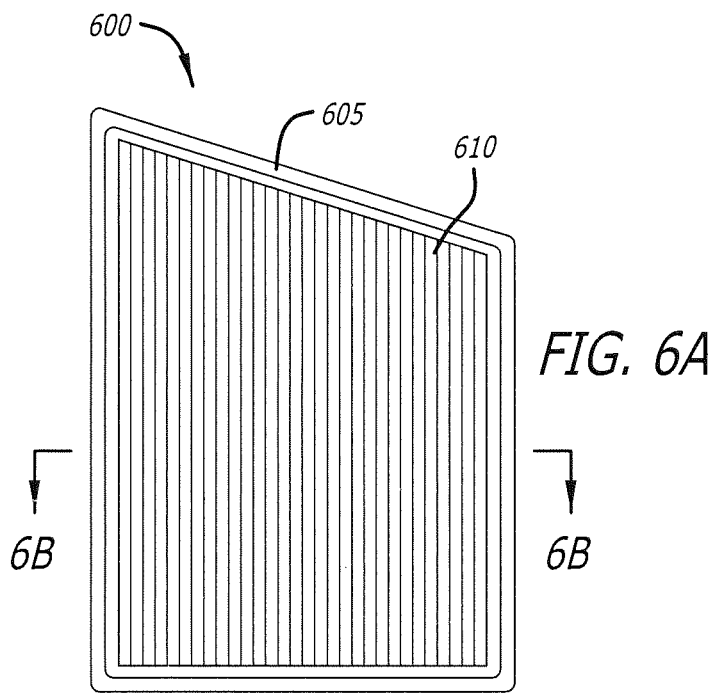
FIG. 6A illustrates a bottom plan view of an exemplary embodiment of a right-angled trapezoid-shaped reusable air filter comprising a tray and a filter medium.
Figure 6B:
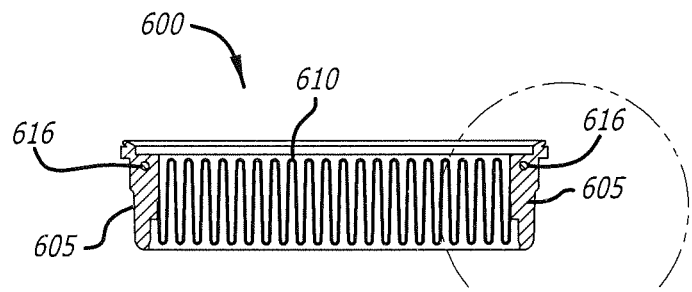
FIG. 6B illustrates a cross-sectional view of the reusable air filter of FIG. 6A, taken along a line 6B-6B.
Figure 6C:
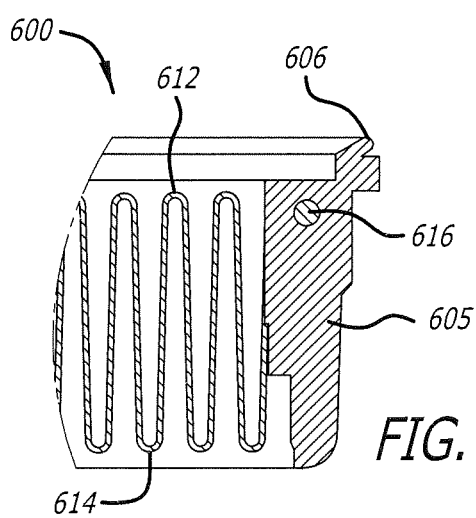
FIG. 6C illustrates a close-up view of the reusable air filter shown in FIG. 6B.

FIGS. 6A-6C illustrate an exemplary embodiment of a flat, panel-shaped reusable air filter 600. The reusable air filter 600 is substantially similar to the reusable air filter 200, illustrated in FIGS. 2A-2D, with the exception that the air filter 600 has a right-angled trapezoid shape. The reusable air filter 600 generally is comprised of a filter medium 610 that is bordered by a tray 605. The filter medium 610 preferably comprises pleated layers of cotton gauze configured to increase the filtration surface area within the tray 605. The cotton may be advantageously treated with a suitably formulated filter oil composition that causes tackiness throughout microscopic strands comprising the filter medium. As described above, the filter medium 610 comprising the cotton combined with the filter oil composition provides relatively high volumes of filtered airflow.

As shown best shown in FIGS. 6B-6C, the filter medium 610 is comprised of a series of pleated layers of cotton gauze disposed in a generally sinusoidal arrangement. As best shown in FIG. 6C, the sinusoidal arrangement of the filter medium 610 comprises peaks 612 and troughs 614 configured to provide a filtration surface area that is substantially larger than the cross-sectional area of the tray 605. The large filtration surface area exhibits relatively little resistance to airflow through the filter medium 610, thereby giving rise to proportionally greater engine power output. In one embodiment, the peaks 612 and troughs 614 have a pleat height, peak-to-peak, of substantially 1.95". It should be understood, however, that the pleat height, as well as the overall size of the reusable air filter 600 will be dependent upon the particular engine application for which the reusable air filter is intended to be used.

As best shown in FIGS. 6B-6C, the sides of the tray 605 are reinforced by support rods 616 that are embedded within the material comprising the tray. As will be appreciated, the support rods 616 serve to prevent the sides of the tray 605 from bowing under air pressure, particularly when subjected to engine heat, when coupled with an air box. Further, a lip 606 is disposed along the top-most edge of the tray 605 and configured to facilitate coupling the reusable air filter 600 within the air box, or within suitable air ducting. The lip 606 preferably is comprised of a pliable material and configured to establish an airtight seal with a mounting surface within the air box, thereby ensuring all air flowing through the air box, or ducting, is directed through the filter medium 610. It is contemplated that, in addition to the lip 606, any of suitably designed holes, brackets, molded shaped portions, protrusions, extensions, angled brackets, hardware fasteners, or any other similar device may be implemented for holding the reusable air filter 600 advantageously fixed within the air box. It should be understood, however, that the particular fasteners will vary according to the specific make and model of the vehicle, as well as the air box configuration, with which the reusable air filter 600 is to be used.

It is contemplated that a user of any of the above-discussed reusable air filters may periodically clean the filter medium of the air filter rather than replacing the entirety of the air filter, as is typically done with conventional air filtrations systems. It is envisioned that the air filter may be removed from any of the air boxes discussed herein and then a water hose may be used to flush contaminants from the filter medium. In some embodiments, wherein the filter medium comprises a filter oil composition, a solvent may be used to remove the oil from the filter medium, thereby rendering the air filter clean and ready for reuse. Once the filter medium is completely dry, a suitably formulated filter oil composition may be uniformly applied and allowed to wick into the filter medium. Filter oil compositions are discussed in greater detail in U.S. patent application Ser. No. 14/701,163, incorporated hereinabove by reference. Various other cleaning methods will be apparent to those skilled in the art without deviating from the spirit and scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A reusable air filter for filtering air being conducted to an air intake of an internal combustion engine, comprising:
   a filter medium configured to pass an airstream and entrap particulates flowing within the airstream; and
   a reinforced end cap and a base configured to retain the filter medium therebetween, wherein a reinforcement ring is disposed within material comprising the reinforced end cap, the reinforcement ring being configured to provide structural integrity to the reusable air filter wherein the end cap having a generally square shape having a plurality of straight sides and a plurality of inwardly protruding waved sides.

2. The reusable air filter of claim 1, wherein the reinforcement ring includes a plurality of holes configured to facilitate bonding of the material comprising the reinforced end cap with the reinforcement ring.

3. The reusable air filter of claim 1, wherein the reinforcement ring includes one or more protrusions.

4. The reusable air filter of claim 3, wherein the one or more protrusions extend radially from a center of the reinforcement ring.

5. The reusable air filter of claim 1, wherein the base is configured to support the air filter and provide an interface between the air filter and an air inlet of the internal combustion engine.

6. The reusable air filter of claim 5, wherein the interface is comprised of an inlet receiver configured to be coupled with any of an intake pipe, a turbocharger, and a manifold of the internal combustion engine.

7. The reusable air filter of claim 5, wherein the base comprises any of a variety of ridges and raised portions to optimally engage with the air inlet.

8. A reusable air filter for filtering air being conducted to an air intake of an internal combustion engine, comprising:
   a filter medium configured to pass an airstream and entrap particulates flowing within the airstream; and
   a reinforced end cap disposed at a first end of the filter medium, wherein a reinforcement ring is disposed within material comprising the reinforced end cap, the reinforcement ring being configured to provide structural integrity to the reusable air filter wherein the reinforced end cap comprising at least a plurality of inwardly protruding waved sides.

9. The reusable air filter of claim 8, wherein the reinforcement ring includes a plurality of holes configured to facilitate bonding of the material comprising the reinforced end cap with the reinforcement ring.

10. The reusable air filter of claim 8, wherein the reinforcement ring includes one or more protrusions.

11. The reusable air filter of claim 10, wherein the one or more protrusions extend radially from a center of the reinforcement ring.

12. A method for a reusable air filter for filtering air being conducted to an air intake of an internal combustion engine, comprising:
configuring a cleanable filter medium to entrap particulates flowing within an airstream;
forming the cleanable filter medium into a shape that facilitates coupling the reusable air filter with an air box, such that an entirety of the airstream is passed through the filter medium;
contouring the cleanable filter medium to provide a filtration surface area that is larger than an area of the shape; and
coupling the filter medium with one or more support structures including a reinforced end cap and a base that maintain the shape of the filter medium, wherein a reinforcement ring is disposed within material comprising the reinforced end cap, the reinforcement ring being configured to provide structural integrity to the reusable air filter, wherein the reinforced end cap comprises at least a plurality of inwardly protruding waved sides.

13. The method of claim 12, wherein the reinforcement ring includes a plurality of holes configured to facilitate bonding of the material comprising the reinforced end cap with the reinforcement ring.

14. The method of claim 12, wherein the reinforcement ring includes one or more protrusions.

15. The method of claim 14, wherein the one or more protrusions extend radially from a center of the reinforcement ring.

16. The method of claim 12, wherein forming further comprises forming the cleanable filter medium into any one of a cylindrical shape, a cone shape, and a cube shape having waved sides.

17. The method of claim 12, wherein coupling further comprises implementing the support structures as the end cap and the base that is configured to couple with an air inlet of the internal combustion engine, the air inlet being any of an intake pipe, a turbocharger, and a manifold of the internal combustion engine.

18. The method of claim 14, wherein forming further comprises forming the cleanable filter medium into any one of a square shape, a rectangle shape, and a trapezoid shape.

* * * * *